US012676040B2

(12) United States Patent　　　　　(10) Patent No.:　US 12,676,040 B2
Sivasanthanam et al.　　　　　　　　 (45) Date of Patent:　　　Jul. 7, 2026

(54) METHOD AND SYSTEM FOR IDENTIFYING SECURITY EVENTS IN AN ACCESS CONTROL SYSTEM

(71) Applicant: Honeywell International Inc., Charlotte, NC (US)

(72) Inventors: D Sivasanthanam, Bangalore (IN); Ramkumar A, Tamil Nadu (IN); Pandurengan G, Tamil Nadu (IN); Vivek Kumar Sah, Delhi (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 253 days.

(21) Appl. No.: 18/522,164

(22) Filed: Nov. 28, 2023

(65) Prior Publication Data

US 2025/0174065 A1　　　May 29, 2025

(51) Int. Cl.
　*G07C 9/29*　　　(2020.01)
　*G06N 20/00*　　　(2019.01)
(52) U.S. Cl.
　CPC ............... *G07C 9/29* (2020.01); *G06N 20/00* (2019.01)
(58) Field of Classification Search
　CPC ... G07C 9/29; G07C 9/22; G07C 9/27; G06N 20/00; G06N 3/091; G08B 13/19613; G08B 29/186; G06V 20/44; G06V 20/52; G06V 40/172; H04N 7/188; G06F 21/62; G06F 21/30
　See application file for complete search history.

(56) References Cited

U.S. PATENT DOCUMENTS

| | | | |
|---|---|---|---|
| 8,793,790 | B2 | 7/2014 | Khurana et al. |
| 10,096,235 | B2 | 10/2018 | Cobb et al. |
| 10,140,453 | B1 | 11/2018 | Fridakis |

(Continued)

FOREIGN PATENT DOCUMENTS

| | | |
|---|---|---|
| CN | 113139476 A | 7/2021 |
| KR | 1784821 B1 | 10/2017 |
| WO | 2020016906 A1 | 1/2020 |

OTHER PUBLICATIONS

Arcules, "Cloud Security for Data Centers," 7 pages, 2021. No additional dated given.

(Continued)

*Primary Examiner* — Rufus C Point

(74) *Attorney, Agent, or Firm* — Seager, Tufte & Wickhem, LLP

(57)　　　　　　　ABSTRACT

An access control system includes access control devices for reading access control keys that are each associated with a corresponding one of a plurality of authorized users of the facility. Access requests from the access control devices are presented to an Artificial Intelligence and/or Machine Learning (AI/ML) engine, the AI/ML engine identifying one or more of the plurality of access requests as a flagged access request that represents a possible security event for the facility. One or more images from a security camera that captures the flagged access request are displayed for review by a security operator and a response is entered by the security operator that classifies the flagged access request as either a legitimate access request or an illegitimate access request. An alert is issued when the response classifies the flagged access request as an illegitimate access request.

20 Claims, 7 Drawing Sheets

(56)  References Cited

U.S. PATENT DOCUMENTS

| | | | |
|---|---|---|---|
| 10,505,959 B1 | 12/2019 | Wang et al. | |
| 11,631,306 B2 | 4/2023 | Srinivasan et al. | |
| 11,640,462 B2 | 5/2023 | Shrestha et al. | |
| 11,720,836 B1 | 8/2023 | Coles et al. | |
| 2003/0217024 A1 | 11/2003 | Kocher | |
| 2010/0207762 A1 | 8/2010 | Lee et al. | |
| 2010/0208063 A1 | 8/2010 | Lee et al. | |
| 2011/0050876 A1 | 3/2011 | Nagata et al. | |
| 2013/0030875 A1 | 1/2013 | Lee et al. | |
| 2013/0091539 A1 | 4/2013 | Khurana et al. | |
| 2013/0100268 A1 | 4/2013 | Mihailidis et al. | |
| 2014/0140590 A1 | 5/2014 | Wilson et al. | |
| 2014/0347479 A1 | 11/2014 | Givon | |
| 2015/0350902 A1* | 12/2015 | Baxley | H04B 17/318 |
| | | | 726/7 |
| 2017/0126710 A1 | 5/2017 | De-Levie et al. | |
| 2018/0024091 A1 | 1/2018 | Wang et al. | |
| 2018/0047274 A1 | 2/2018 | Miwa | |
| 2018/0165781 A1* | 6/2018 | Rodriguez | H04L 63/08 |
| 2018/0330302 A1 | 11/2018 | Peterson et al. | |
| 2019/0035242 A1* | 1/2019 | Vazirani | G08B 13/19695 |
| 2019/0164110 A1 | 5/2019 | Shiraishi | |
| 2019/0180539 A1 | 6/2019 | Alkhhabbaz et al. | |
| 2019/0244492 A1 | 8/2019 | Horgan et al. | |
| 2019/0253314 A1 | 8/2019 | Bou Fadel | |
| 2019/0392700 A1 | 12/2019 | Darling et al. | |
| 2020/0074311 A1 | 3/2020 | Samanta et al. | |
| 2020/0383172 A1 | 12/2020 | McCracken et al. | |
| 2020/0412754 A1 | 12/2020 | Crabtree et al. | |
| 2021/0004482 A1 | 1/2021 | McFarlane | |
| 2021/0042509 A1 | 2/2021 | Valiulla | |
| 2021/0142045 A1* | 5/2021 | Noest | H04N 13/282 |
| 2021/0264137 A1* | 8/2021 | Rao | G06V 20/52 |
| 2021/0288990 A1 | 9/2021 | Kao et al. | |
| 2021/0358244 A1* | 11/2021 | Chafni | G06N 3/09 |
| 2022/0067208 A1 | 3/2022 | Miller | |
| 2022/0215347 A1 | 7/2022 | Peres et al. | |
| 2022/0368714 A1 | 11/2022 | Garchery et al. | |
| 2022/0377093 A1 | 11/2022 | Crabtree et al. | |
| 2022/0391508 A1 | 12/2022 | Garchery et al. | |
| 2023/0039382 A1 | 2/2023 | Xu et al. | |
| 2023/0177934 A1 | 6/2023 | Reddy et al. | |
| 2023/0316726 A1 | 10/2023 | Selinger | |

OTHER PUBLICATIONS

Poh et al., "Physical Access Log Analysis: An Unsupervised Clustering Approach for Anomaly Detection," 7 pages, Jul. 2020. Published Aug. 26, 2020.

Skopik et al. "Behavior Based Anomaly Detection in Log Data of Physical Access Control Systems," IEEE Transactions on Dependable and Secure Computing, vol. 20, No. 4, 18 pages, Jul./Aug. 2023.

Extended European Search Report, EP Application No. 24210510.4, European Patent Office, May 12, 2025 (11 pages).

* cited by examiner

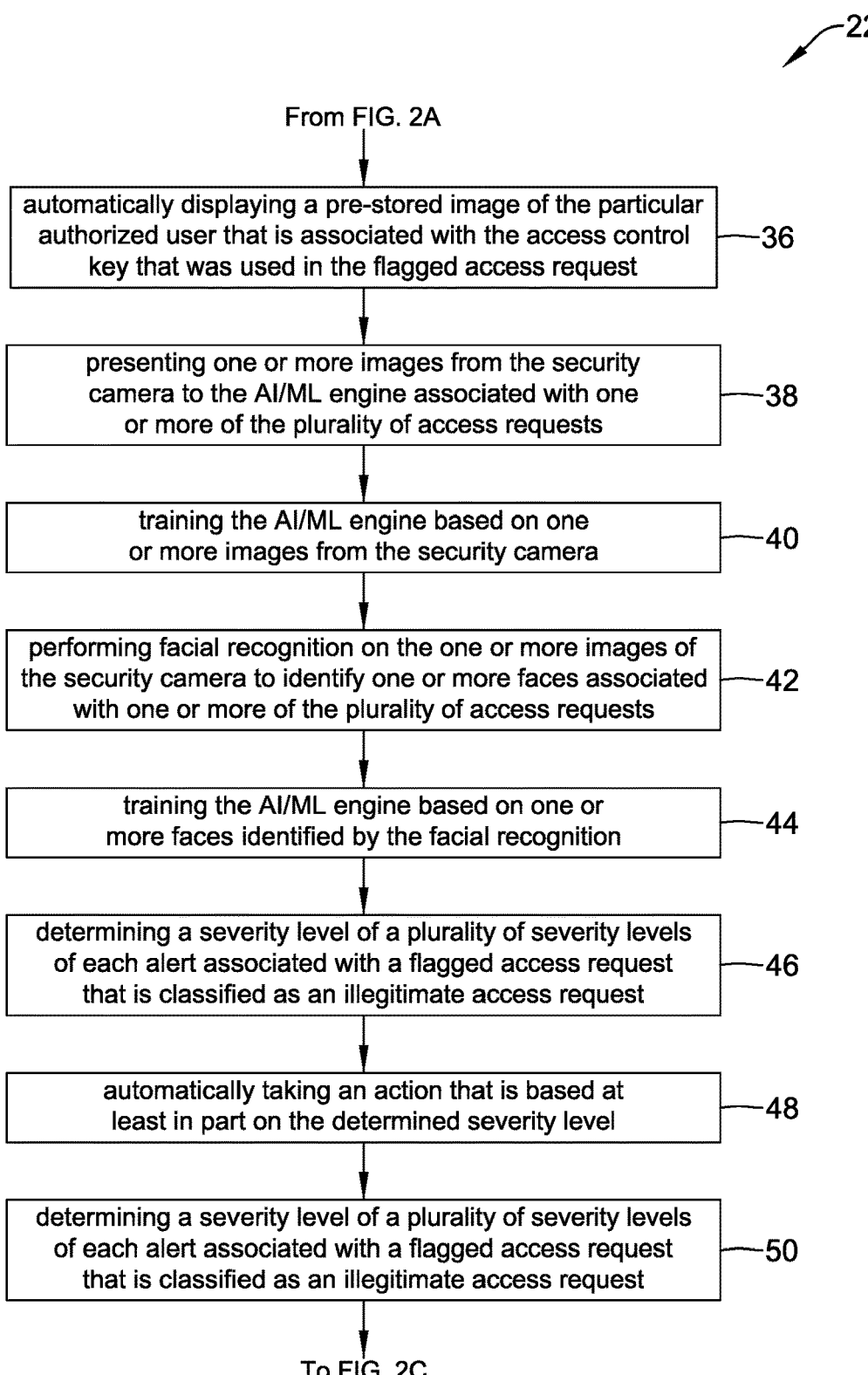

From FIG. 2A automatically displaying a pre-stored image of the particular authorized user that is associated with the access control key that was used in the flagged access request ——36 presenting one or more images from the security camera to the AI/ML engine associated with one or more of the plurality of access requests ——38 training the AI/ML engine based on one or more images from the security camera ——40 performing facial recognition on the one or more images of the security camera to identify one or more faces associated with one or more of the plurality of access requests ——42 training the AI/ML engine based on one or more faces identified by the facial recognition ——44 determining a severity level of a plurality of severity levels of each alert associated with a flagged access request that is classified as an illegitimate access request ——46 automatically taking an action that is based at least in part on the determined severity level ——48 determining a severity level of a plurality of severity levels of each alert associated with a flagged access request that is classified as an illegitimate access request ——50

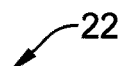

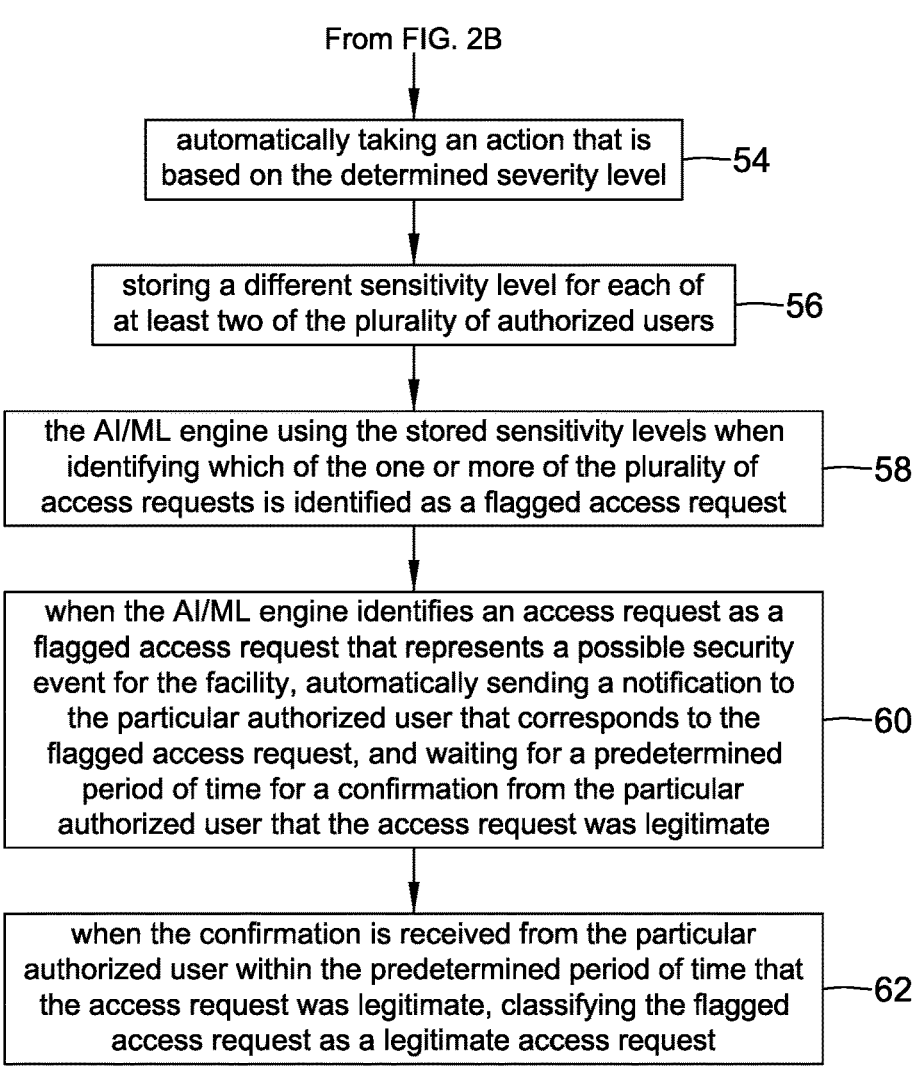

From FIG. 2B automatically taking an action that is based on the determined severity level —54 storing a different sensitivity level for each of at least two of the plurality of authorized users —56 the AI/ML engine using the stored sensitivity levels when identifying which of the one or more of the plurality of access requests is identified as a flagged access request —58 when the AI/ML engine identifies an access request as a flagged access request that represents a possible security event for the facility, automatically sending a notification to the particular authorized user that corresponds to the flagged access request, and waiting for a predetermined period of time for a confirmation from the particular authorized user that the access request was legitimate —60 when the confirmation is received from the particular authorized user within the predetermined period of time that the access request was legitimate, classifying the flagged access request as a legitimate access request —62

FIG. 2C

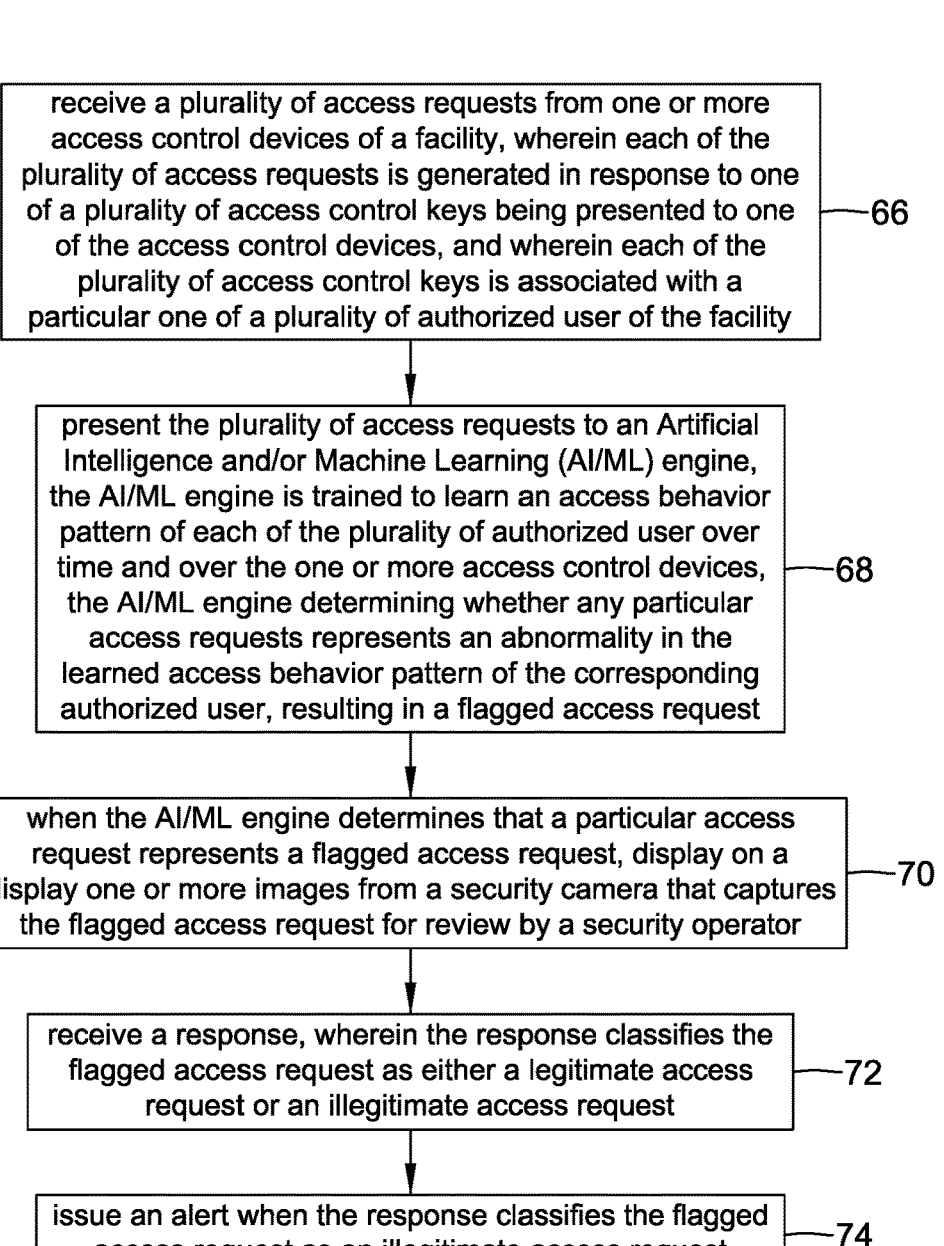

64 receive a plurality of access requests from one or more access control devices of a facility, wherein each of the plurality of access requests is generated in response to one of a plurality of access control keys being presented to one of the access control devices, and wherein each of the plurality of access control keys is associated with a particular one of a plurality of authorized user of the facility — 66 present the plurality of access requests to an Artificial Intelligence and/or Machine Learning (AI/ML) engine, the AI/ML engine is trained to learn an access behavior pattern of each of the plurality of authorized user over time and over the one or more access control devices, the AI/ML engine determining whether any particular access requests represents an abnormality in the learned access behavior pattern of the corresponding authorized user, resulting in a flagged access request — 68 when the AI/ML engine determines that a particular access request represents a flagged access request, display on a display one or more images from a security camera that captures the flagged access request for review by a security operator — 70 receive a response, wherein the response classifies the flagged access request as either a legitimate access request or an illegitimate access request — 72 issue an alert when the response classifies the flagged access request as an illegitimate access request — 74

FIG. 3

METHOD AND SYSTEM FOR IDENTIFYING SECURITY EVENTS IN AN ACCESS CONTROL SYSTEM

TECHNICAL FIELD

The present disclosure relates generally to access control systems and more particularly to using artificial intelligence in an access control system to determine when an access control key is being improperly used.

BACKGROUND

Access control systems employ a large number of access control keys. Individuals may present their access control key to an access control device in order for the access control device to identify the individual and ascertain whether that individual is authorized to gain access to a space protected by the access control device. Access control keys may become lost, but an individual may not be immediately aware that their access control key has been lost or misplaced. After several days, the individual will likely report that the access control key has been lost, resulting in the access control key becoming disabled and thus no longer usable. Until that time, however, the access control key remains active and may be used by an individual who does not have authorization to access the space protected by the access control device. This can mean that an individual may gain unauthorized access to a building or to restricted areas within the building, potentially compromising the safety of employees and valuable assets. This can mean that an individual may steal or damage property, including sensitive data, equipment, or other valuable assets. This can mean damage to an organization's reputation, leading to loss of customer trust, negative media coverage, and reduced business opportunities. What would be desirable are methods and systems that allow an access control system to ascertain when an access control key is being used by an unauthorized individual.

SUMMARY

The present disclosure relates generally to access control systems and more particularly to using artificial intelligence in an access control system to determine when an access control key is being improperly used. An example may be found in a method for identifying security events of a facility using an access control system that controls access in the facility. The access control system includes one or more access control devices each located at a corresponding location in the facility for reading access control keys that are each associated with a corresponding one of a plurality of authorized users of the facility. The illustrative method includes receiving a plurality of access requests from the one or more access control devices of the facility, wherein each of the plurality of access requests is generated in response to one of the access control keys being presented to one of the access control devices. Each of the plurality of access requests identifies the particular authorized user associated with the access control key of the corresponding access request, a timestamp associated with the corresponding access request, and a location identifier that identifies the location of the access control device associated with the corresponding access request. The plurality of access requests are presented to an Artificial Intelligence and/or Machine Learning (AI/ML) engine. The AI/ML engine identifies each of one or more of the plurality of access requests as a flagged access request that represents a possible security event for the facility. The illustrative method includes automatically displaying on a display one or more images from a security camera that captures the flagged access request for review by a security operator and receiving a response entered by the security operator, when the response classifies the flagged access request as either a legitimate access request or an illegitimate access request. The AI/ML engine is trained based on the flagged access request and the corresponding received response. An alert is issued and/or a corrective action is taken when the response classifies the flagged access request as an illegitimate access request.

Another example may be found in an access control system for a facility. The illustrative access control system includes one or more access control devices each located at a corresponding location in the facility for reading access control keys that are each associated with a corresponding one of a plurality of authorized users of the facility, a display, one or more security cameras, and a controller operatively coupled to the one or more access control devices, the display and the one or more security cameras. The controller is configured to receive a plurality of access requests from the one or more access control devices, wherein each of the plurality of access requests is generated in response to one of the plurality of access control keys being presented to one of the access control devices, and wherein each of the plurality of access control keys is associated with a particular one of a plurality of authorized user of the facility. The controller is configured to present the plurality of access requests to an Artificial Intelligence and/or Machine Learning (AI/ML) engine. The AI/ML engine is trained to learn an access behavior pattern of each of the plurality of authorized user over time and across the one or more access control devices. The AI/ML engine determines when any particular access requests represents an abnormality in the learned access behavior pattern of the corresponding authorized user, resulting in a flagged access request. When the AI/ML engine determines that a particular access request represents a flagged access request, the controller is configured to display on the display one or more images from one or more of the security cameras that capture the flagged access request for review by a security operator on the display. The controller is configured to receive a response from the security operator that classifies the flagged access request as either a legitimate access request or an illegitimate access request. The controller re-trains the AI/ML engine based on the flagged access request and the corresponding received response. The controller is configured to issue an alert and/or take a corrective action when the response classifies the flagged access request as an illegitimate access request.

Another example may be found in a non-transitory computer readable medium storing instructions that when executed by one or more processors cause the one or more processors to receive a plurality of access requests from one or more access control devices of a facility, wherein each of the plurality of access requests is generated in response to one of a plurality of access control keys being presented to one of the access control devices, and wherein each of the plurality of access control keys is associated with a particular one of a plurality of authorized user of the facility. The one or more processors are caused to present the plurality of access requests to an Artificial Intelligence and/or Machine Learning (AI/ML) engine, the AI/ML engine is trained to learn an access behavior pattern of each of the plurality of authorized user over time and over the one or more access control devices. The AI/ML engine determines whether any particular access requests represents an abnormality in the learned access behavior pattern of the corresponding authorized user, resulting in a flagged access request. When the AI/ML engine determines that a particular access request represents a flagged access request, the one or more processors are caused to display on a display one or more images from a security camera that captures the flagged access request for review by a security operator. The one or more processors are caused to receive a response from the security operator, wherein the response classifies the flagged access request as either a legitimate access request or an illegitimate access request, and to issue an alert and/or take a corrective action when the response classifies the flagged access request as an illegitimate access request.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIGS. 2A, 2B and 2C are flow diagrams that together show an illustrative method for identifying security events;

FIG. 3 is a flow diagram showing an illustrative series of steps that may be carried out by one or more processors when executing executable instructions;

Figure 1:
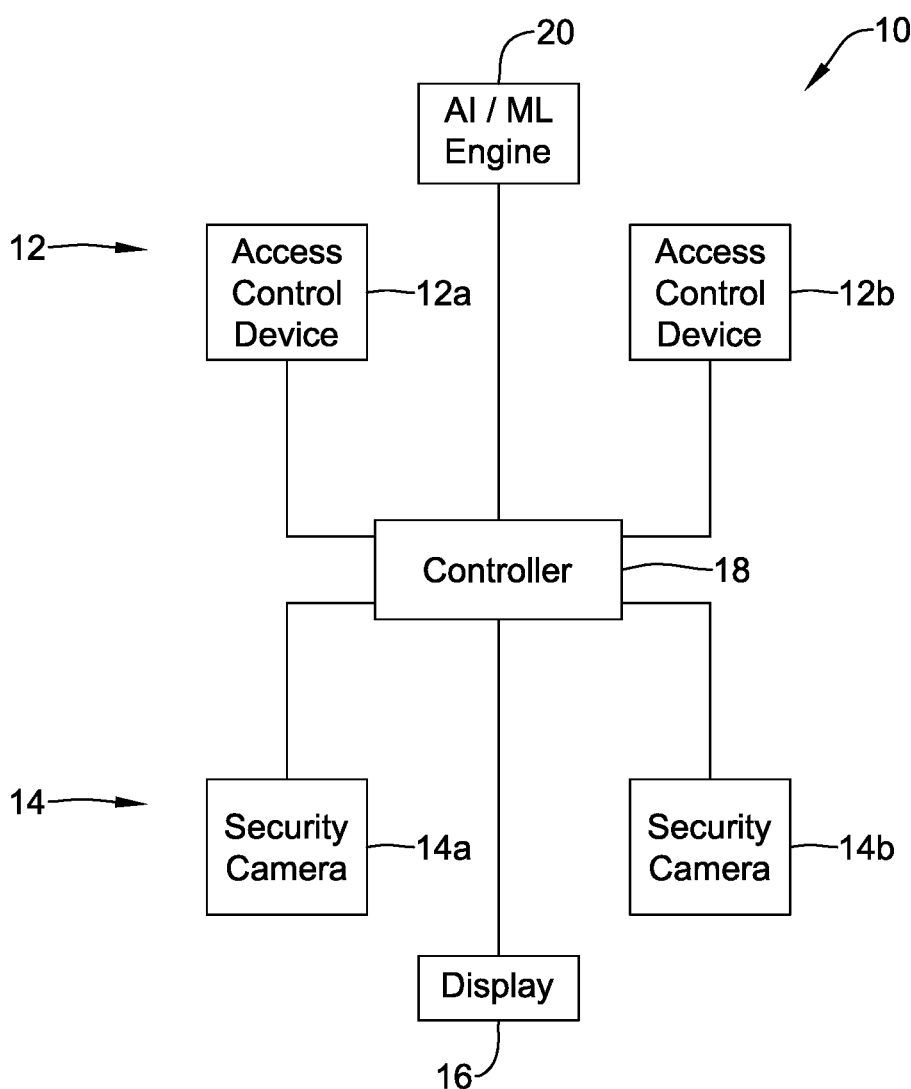
FIG. 1 is a schematic block diagram showing an illustrative access control system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative access control system 10 that may be deployed within a facility. The illustrative access control system 10 includes one or more access control devices 12 that are each located at a corresponding location in the facility, individually labeled as 12a and 12b. While a total of two access control devices 12 are shown, it will be appreciated that the access control system 10 may include a substantially greater number of access control devices 12, and may have an access control device 12 adjacent each secured door, for example. Each of the access control devices 12 may be configured to read the access control keys that are each associated with a corresponding one of a plurality of authorized users of the facility. In some instances, the access control keys may be access control cards that can be scanned by any of the access control devices 12. In some cases, the access control keys may be user's mobile devices loaded with an authorized access control key application program, access control key fobs, user's biometric information such as fingerprints or retinas that can be scanned by access control devices 12, or any other suitable access control key that can be read or scanned by the access control devices 12.

The illustrative access control system 10 includes one or more security cameras 14, individually labeled as 14a and 14b. While a total of two security cameras 14 are shown, it will be appreciated that the access control system 10 may include a substantially greater number of security cameras 14, and may have a security camera 14 adjacent each secured door, for example. In some instances, some of the security cameras 14 may be specifically assigned to particular secured doors. In some instances, some of the security cameras 14 may be assigned to cover particular areas, and may have a field of view (FOV) that also covers one or more of the secured doors.

The illustrative access control system 10 includes a display 16 that may be used for displaying video clips and/or live video streams or other images captured by one or more of the security cameras 14, for example. The illustrative access control system 10 includes a controller 18 that is operatively coupled with the access control devices 12, the security cameras 14 and the display 16. The controller 18 may be a local computer such as a desktop computer or a laptop computer. In some instances, the controller 18 may be a remote computer, such as a cloud-based server. The controller may be implemented in a control panel of the access control system 10. In any event, the controller 18 is configured to receive a plurality of access requests from the one or more access control devices 12, wherein each of the plurality of access requests is generated in response to one of the plurality of access control keys being presented to one of the access control devices 12, and wherein each of the plurality of access control keys is associated with a particular one of a plurality of authorized user of the facility.

The controller 18 is configured to present the plurality of access requests to an Artificial Intelligence and/or Machine Learning (AI/ML) engine 20. The AI/ML engine 20 may be manifested on a local computer, a remote computer and/or a control panel of the access control system 10, for example. The AI/ML engine 20 is trained to learn an access behavior pattern of each of the plurality of authorized user over time and across the one or more access control devices 12. From this baseline, the AI/ML engine 20 determines when any particular access requests represents an abnormality in the learned access behavior pattern of the corresponding authorized user, resulting in a flagged access request. When the AI/ML engine 20 determines that a particular access request represents a flagged access request, the controller 18 is configured to display on the display 16 one or more images from one or more of the security cameras 14 that captured the flagged access request for review by a security operator on the display 16. The controller 18 is configured to receive a response from the security operator, wherein the response classifies the flagged access request as either a legitimate access request or an illegitimate access request. The controller 18 is configured to re-train the AI/ML engine 20 based on the flagged access request and the corresponding received response, and issue an alert and/or take an action when the response classifies the flagged access request as an illegitimate access request.

In some cases, when the response classifies the flagged access request as an illegitimate access request, the controller 18 automatically takes corrective action. In some instances, the corrective action may include locking down one or more access control devices 12 to prevent access to the corresponding region of the facility. In some instances, the corrective action may include disabling an access control key that is associated with the particular authorized user that is associated with the flagged access request. The corrective action may include both actions. In some cases, corrective action may include dispatching security personnel to address the flagged access request.

Figure 2A:
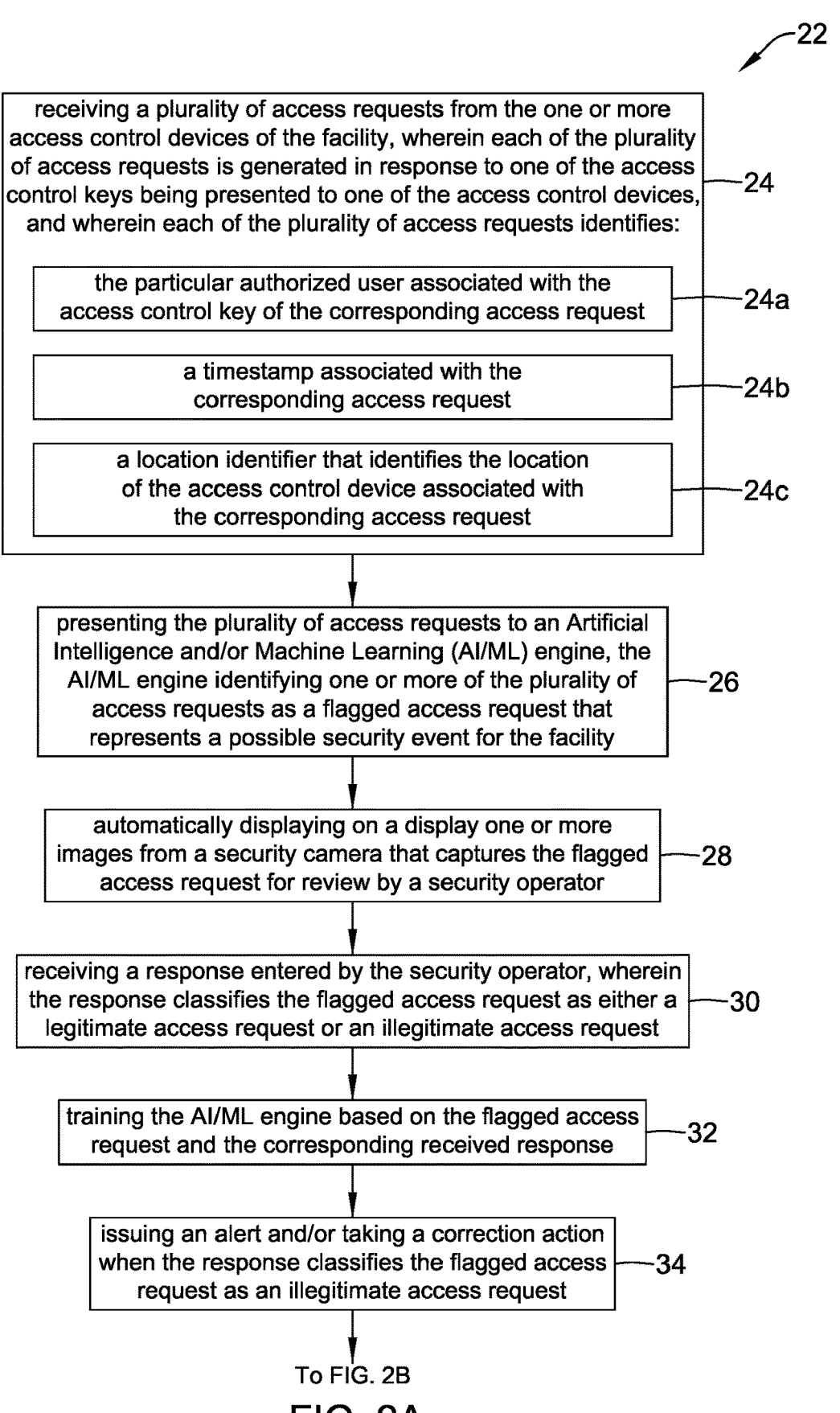

FIGS. 2A, 2B and 2C are flow diagrams that together show an illustrative method 22 for identifying security events of a facility using an access control system (such as the access control system 10) that controls access in the facility. The access control system includes one or more access control devices (such as the access control devices 12) each located at a corresponding location in the facility for reading access control keys that are each associated with a corresponding one of a plurality of authorized users of the facility. The illustrative method 22 includes receiving a plurality of access requests from the one or more access control devices of the facility, wherein each of the plurality of access requests is generated in response to one of the access control keys being presented to one of the access control devices, as indicated at block 24. Each of the plurality of access requests identifies the particular authorized user associated with the access control key of the corresponding access request, as indicated at block 24a. Each of the plurality of access requests identifies a timestamp associated with the corresponding access request, as indicated at block 24b. Each of the plurality of access requests identifies a location identifier that identifies the location of the access control device associated with the corresponding access request, as indicated at block 24c.

The plurality of access requests are presented to an Artificial Intelligence and/or Machine Learning (AI/ML) engine (such as the AI/ML engine 20). The AI/ML engine identifying one or more of the plurality of access requests as a flagged access request that represents a possible security event for the facility, as indicated at block 26. The illustrative method 22 includes automatically displaying on a display (such as the display 16) one or more images from a security camera (such as the security cameras 14) that captures the flagged access request for review by a security operator, as indicated at block 28. A received response is entered by the security operator, where the response classifies the flagged access request as either a legitimate access request or an illegitimate access request, as indicated at block 30. The AI/ML engine is then trained and/or retrained based on the flagged access request and the corresponding received response, as indicated at block 32.

In some instances, the AI/ML engine may be trained to determine whether a particular access request of a particular authorized user is a flagged access request based on the particular access request of the particular authorized user and a learned past behavior of the particular authorized user that is based on past access requests of the particular authorized user. As an example, the learned past behavior of the particular authorized user may include a learned pattern of past access requests of the particular authorized user. In some instances, the learned pattern of past access requests of the particular authorized user may include a learned pattern in time of one or more past access requests of the particular authorized user. In some instances, the learned pattern of past access requests of the particular authorized user may include a learned pattern in space, e.g. a learned pattern in one or more access control devices associated with one or more past access requests of the particular authorized user. An alert is issued (and/or a corrective action is taken) when the response classifies the flagged access request as an illegitimate access request, as indicated at block 34.

In some cases, and as shown in FIG. 2B, a pre-stored image of the particular authorized user that is associated with the access control key that was used in the flagged access request may be automatically retrieved and displayed on the display, as indicated at block 36. This may aid the security operator in determining whether the flagged access request is legitimate or illegitimate.

In some instances, one or more images from the security camera may be presented to the AI/ML engine that are associated with one or more of the plurality of access requests, as indicated at block 38. The AI/ML engine may be trained to determine whether a particular access request of a particular authorized user is a flagged access request based on one or more images from the security camera, as indicated at block 40.

In some instances, the illustrative method 22 may include performing facial recognition on the one or more images of the security camera to identify one or more faces associated with one or more of the plurality of access requests, as indicated at block 42. The AI/ML engine may be trained to determine whether a particular access request of a particular authorized user is a flagged access request based on one or more faces identified by the facial recognition, as indicated at block 44.

In some instances, the AI/ML engine may be trained over a period of time to determine whether any particular access request should be identified as a flagged access request and/or classifying flagged access requests as either legitimate access requests or illegitimate access requests, based at least in part on facial recognition performed on real time image(s) from security camera(s) capturing the access request and comparison of recognized facial traits with stored facial traits of individual(s) whose access request(s) was/were previous classified as either a legitimate or an illegitimate access request post review by security operator (e.g. in the recent past). This intelligence can help the AI/ML engine itself make decisions on whether any particular access request is an illegitimate access request, and accordingly, issue an alert and/or take a corrective action when the flagged access request is classified by the AI/ML engine as an illegitimate access request. Further, the AI/ML engine can take care of aging-related facial recognition problems when pre-stored images of the particular authorized user are constantly updated using most recently captured images of that user captured during any latest historical flagged access event which was classified as a legitimate access request based on a response from an operator.

In some instances, the method 22 may include determining a severity level of a plurality of severity levels of each alert associated with a flagged access request that is classified as an illegitimate access request, as indicated at block 46. The method 22 may include automatically taking a corrective action that is based at least in part on the determined severity level, as indicated at block 48. As an example, the action may include locking down one or more access control devices and/or disabling an access control key that is associated with the particular authorized user that is associated with the flagged access request. In some instances, the method 22 may include determining a severity level of a plurality of severity levels of each alert associated with a flagged access request that is classified as an illegitimate access request, as indicated at block 50. In some cases, alerts corresponding to the flagged access requests that are classified as an illegitimate access request may be displayed on a display.

As shown in FIG. 2C, the method 22 may further include automatically taking an action that is based on the determined severity level, as indicated at block 54. For example, a severity level "H" could indicate a suspected person is roaming near areas of high importance (e.g., server room, boardroom, power generator room, private cabins, locker areas etc.). A severity level "L" could indicate a suspected person is roaming near areas of low importance (e.g., canteen, parking lot etc.). A severity level "M" could indicate a suspected person is roaming near areas of medium importance (e.g., work floor, focus room, etc.). Severity level "H"/Severity level "M" could fall under "alarm" (i.e., requires security to take an action), while severity level "L" could fall under "event" (i.e., no need to take an action). This approach may use a severity of events based on exposure magnitude which is dependent on areas being traversed by that suspect, and the system is automatically sending an anomaly alert to the security operator along with priority levels so that when the operator receives multiple anomaly alert notifications (pertaining to different access cards) at the same time, the operator can prioritize which event to investigate first.

In some instances, determining the severity level does not necessarily have to be performed only after operator has provided response for classifying "flagged access request" as "illegitimate access request", rather, "severity level determination" can be performed by the AI/ML engine after identifying an access request as a "flagged access request", so that, when the operator is presented with image(s) from a security camera that captured the "flagged access request", the operator is also made aware of the "Severity level" associated with that the "flagged access request". In some instances, there are benefits to highlighting the severity/priority level of the "flagged access requests" to the operator because when the operator receives multiple "flagged access requests" notifications (corresponding to different "access control key"/"access card") on the display at the same time, then it will help the operator in prioritizing which "flagged access request" to investigate first. Hence, the system can display a severity/priority level (High, Medium, Low) identifier with each "flagged access request" notification displayed on the screen, for conveying exposure magnitude associated with each "flagged access request". Severity/priority level "High" could indicate a suspected person is roaming near areas of high importance (e.g., server room, boardroom, power generator room, CXO private cabins, locker areas etc.). Severity level "Low" could indicate a suspected person's roaming near areas of low importance (e.g., canteen, parking lot etc.). Severity level "Medium" could indicate a suspected person's roaming near areas of medium importance (e.g., work floor, focus room, etc.). The severity/priority level of each displayed "flagged access request" may be based on the exposure magnitude associated with "flagged access request", and the exposure magnitude may in some cases be dependent on areas being traversed by that suspect.

In some case, when an abnormality is detected, based on a combination one or more parameters such as location, date, time, magnitude of the abnormality, etc., the system can determine a threat/suspicion level score to predict potential threats to the facility, and accordingly raise an alarm with an appropriate severity level and in some cases take appropriate corrective action (e.g., blocking access, dispatching officials, operator cross check with other integrated system such as Video system to acknowledge the alarm/event, etc.).

In some cases, the method 22 may include storing a different sensitivity level for each of at least two of the plurality of authorized users, as indicated at block 56. The AI/ML engine may use the stored sensitivity levels when identifying which of the one or more of the plurality of access requests is identified as a flagged access request, as indicated at block 58. For example, when an authorized user is new to the facility, the AI/ML engine may not have had time learn a very robust access behavior pattern for that user, and the sensitivity level for that user may be reduced for a period of time to help reduce false positives. Once the AI/ML engine has had time to learn a suitable access behavior pattern for that user, the sensitivity level for that user may be increased.

When the AI/ML engine identifies an access request as a flagged access request that represents a possible security event for the facility, the method 22 may include automatically sending a notification to the particular authorized user that corresponds to the flagged access request, and waiting for a predetermined period of time for a confirmation from the particular authorized user that the access request was legitimate, as indicated at block 60. In some cases, the particular authorized user must provide authentication information such as a PIN, biometric information and/or other authenticating information. When the confirmation is received from the particular authorized user within the predetermined period of time that the access request was legitimate, the method 22 may include classifying the flagged access request as a legitimate access request sometimes without presenting the flagged access request to the security operator for classification, as indicated at block 62.

FIG. 3 is a flow diagram showing an illustrative series of steps 64 that may be carried out by one or more processors when executing instructions that are stored on a non-transitory, computer-readable storage medium. As an example, the one or more processors may be part of the controller 18 shown in FIG. 1. In this example, the one or more processors are caused to receive a plurality of access requests from one or more access control devices of a facility, wherein each of the plurality of access requests is generated in response to one of a plurality of access control keys being presented to one of the access control devices, and wherein each of the plurality of access control keys is associated with a particular one of a plurality of authorized user of the facility, as indicated at block 66. The one or more processors are caused to present the plurality of access requests to an Artificial Intelligence and/or Machine Learning (AI/ML) engine, the AI/ML engine is trained to learn an access behavior pattern of each of the plurality of authorized user over time and over the one or more access control devices. The AI/ML engine determining whether any particular access requests represents an abnormality in the learned access behavior pattern of the corresponding authorized user, resulting in a flagged access request, as indicated at block 68. When the AI/ML engine determines that a particular access request represents a flagged access request, the one or more processors are caused to display on a display one or more images from a security camera that captures the flagged access request for review by a security operator, as indicated at block 70. The one or more processors are caused to receive a response from the security operator, where the response classifies the flagged access request as either a legitimate access request or an illegitimate access request, as indicated at block 72. The one or more processors are caused to issue an alert when the response classifies the flagged access request as an illegitimate access request, as indicated at block 74. In some instances, the alert may include, but is not limited to, details including, for example, a picture and/or a video of the event that caused the alert, a time of the alert, a location of the event that caused the alert, a listing of past alerts caused by the particular user (the user identified by facial recognition, card swipe and/or the like), past alerts caused by the particular user that were re-categorized as legitimate by a security operator, and/or any other suitable information. When the user that caused the alert is registered with the security system, the details may include details regarding the particular registered user, such as a picture of the registered user, access rights assigned to the registered user, contact information of a supervisor of the registered user, a listing of past alerts caused by the registered user, and/or any other suitable information.

In some instances, the one or more processors may re-train the AI/ML engine based on the flagged access request and the corresponding received response. When the response classifies the flagged access request as an illegitimate access request, the one or more processors may automatically take corrective action. As an example, the corrective action may include one or more of locking down one or more access control devices and/or disabling an access control key that is associated with the particular authorized user that is associated with the flagged access request. These are just example corrective actions.

Figure 4:
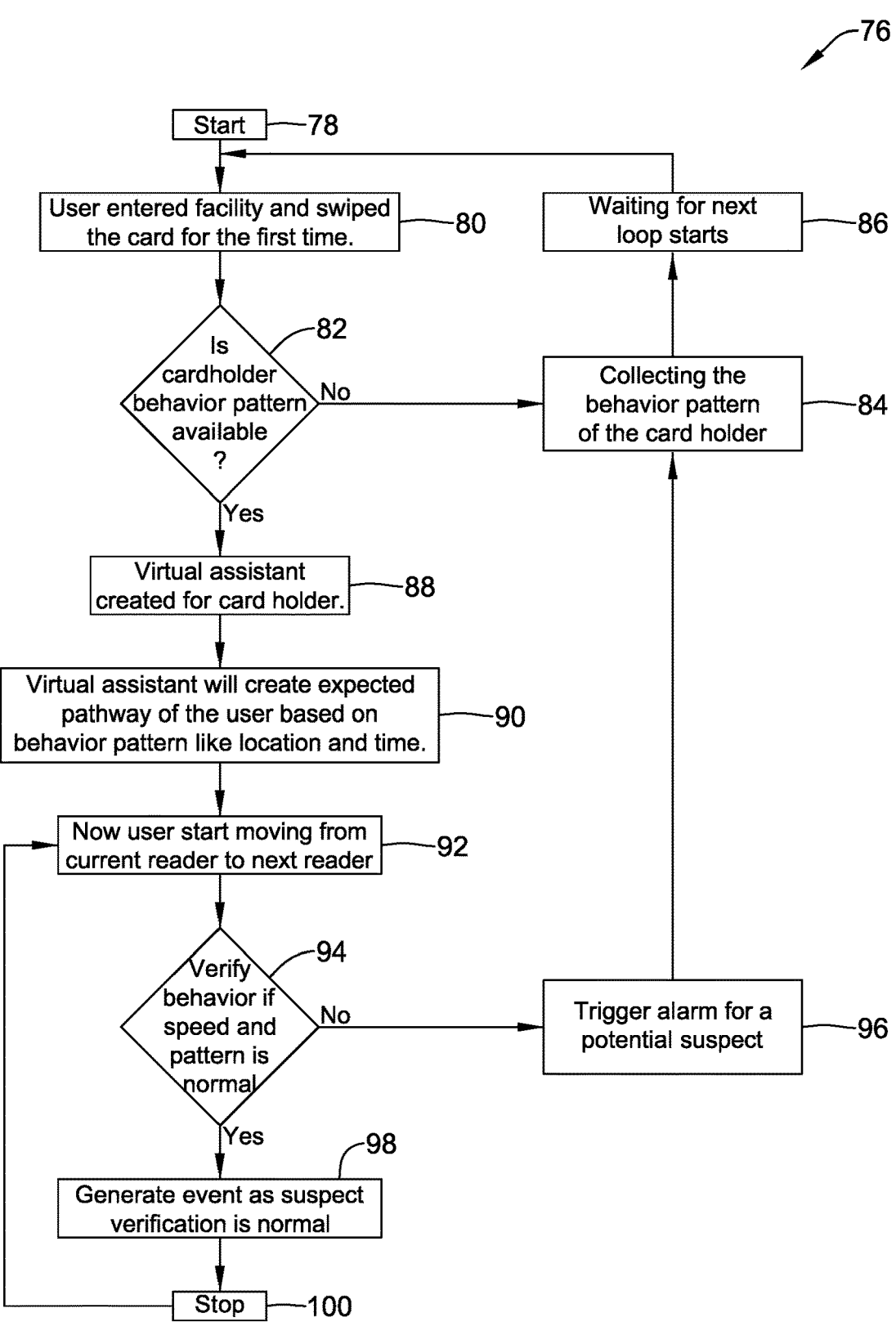
FIG. 4 is a flow diagram showing an illustrative method.

FIG. 4 is a flow diagram showing an illustrative method 76 of operating an access control system such as the access control system 10 shown in FIG. 1. The method 76 begins at a start block 78. A user swipes their access card at a first time, as indicated at block 80. At decision block 82, a determination is made as to whether there is a behavior pattern available for that user. If not, control passes to block 84 where a behavior pattern is collected, followed by looping back through block 86 and back to the top of the method 76. If a behavior pattern is available for that user, control passes to block 88, where a virtual assistant is created for the user. At block 90, the virtual assistant predicts an expected pathway for the user. In some instances, the virtual assistant may be part of an AI/ML engine such as the AI/ML engine 20. The user moves to a subsequent card reader, as indicated at block 92. At decision block 94, a determination is made as to whether the user's behavior matches the expected pathway. If not, control passes to block 96, where an alarm is triggered. In some cases, the alarm and an image from a security camera that captured the user at the subsequent card reader, may be presented to a security operator. The security operator may classify the users access request at the subsequent card reader as legitimate or illegitimate, and the virtual assistant may be re-trained based on the classification. If the user's behavior matches the expected pathway, control passes to block 98 and the event is indicated to be normal. Control then reverts back to block 92. In some cases, control may instead pass to a stop block 100 if the user does not move to any further card readers.

Figure 5:
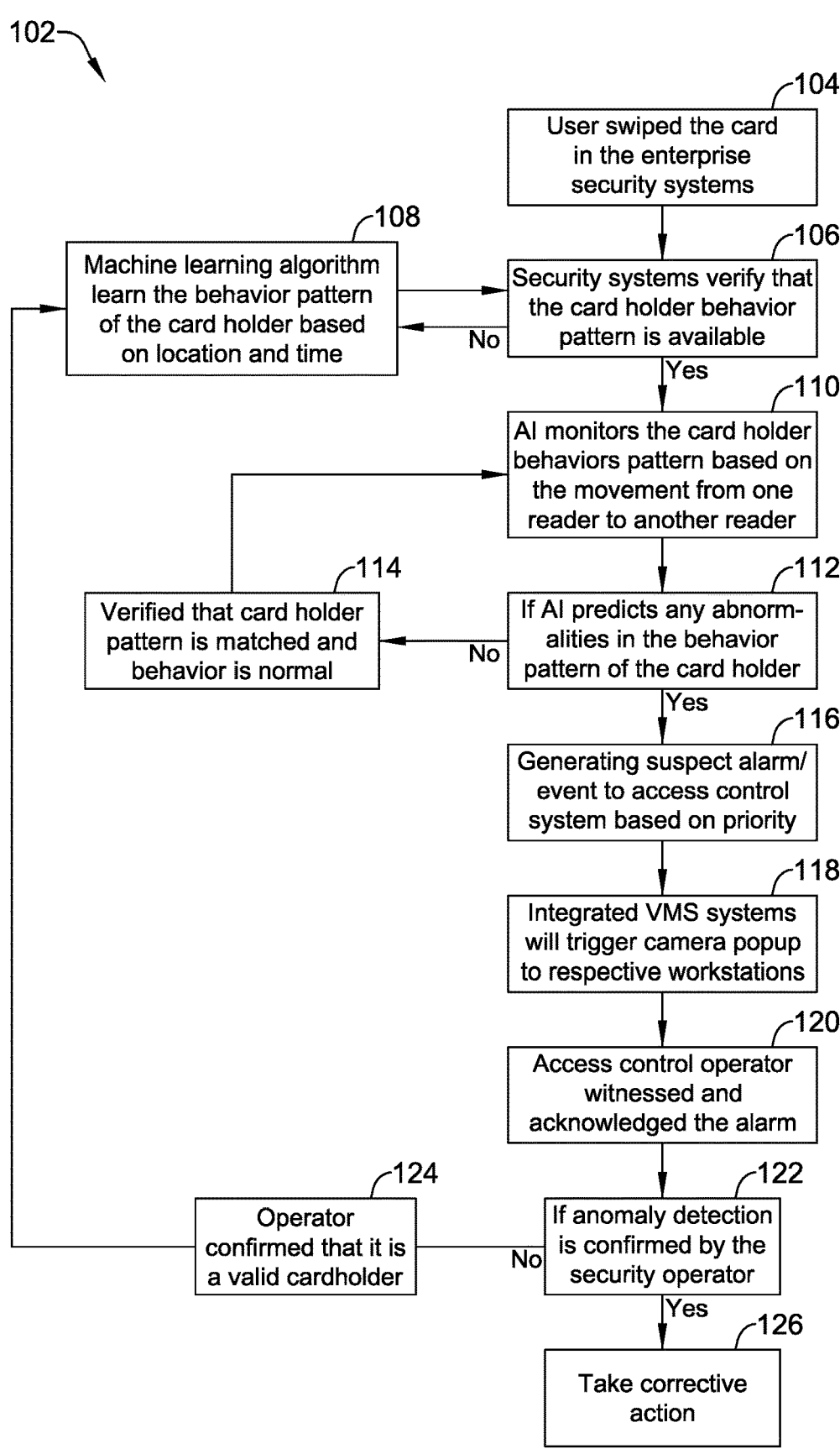
FIG. 5 is a flow diagram showing an illustrative method.

FIG. 5 is a flow diagram showing an illustrative method 102 for operating an access control system such as the access control system 10 shown in FIG. 1. The method 102 begins with a user swiping their access card, as indicated at block 104. The system verifies whether a behavior pattern is available for the user. If no, control passes to block 108, where machine learning starts to learn the behavior pattern for the user. Otherwise, if so, control passes to block 110 where AI monitors the card holder's pattern as they move between card readers. At block 112, a determination is made as to whether there are abnormalities in the card holder's behavior. If not, control passes to block 114 where the behavior is determined to be normal. From there, control reverts back to block 110. If there are abnormalities, control passes to block 116 where a suspect alarm/event is raised. At block 118, integrated VMS (video management systems) within the facility may provide video of the abnormality in the card holder's behavior. An access control system operator views the raised alarm/event and the provided video and acknowledges the alarm/event, as indicated at block 120. A determination is made as to whether the operator confirmed the abnormalities in the card holder's behavior. If the operator did not confirm the abnormality, control passes to block 124 where the operator provides confirmation that the access request was valid. From there, control reverts back to block 110. If the operator confirmed the anomaly detection at block 122, control passes to block 126 and corrective action is taken. In some cases, the corrective action is automatically taken, while in other cases, the operator initiates an appropriate corrective action.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for identifying security events of a facility using an access control system that controls access in the facility, the access control system including one or more access control devices each located at a corresponding location in the facility for reading access control keys that are each associated with a corresponding one of a plurality of authorized users of the facility, the method comprising:

receiving a plurality of access requests from the one or more access control devices of the facility, wherein each of the plurality of access requests is generated in response to one of the access control keys being presented to one of the access control devices, and wherein each of the plurality of access requests identifies:

the particular authorized user associated with the access control key of the corresponding access request;

a timestamp associated with the corresponding access request; and a location identifier that identifies the location of the access control device associated with the corresponding access request;

presenting the plurality of access requests to an Artificial Intelligence and/or Machine Learning (AI/ML) engine, the AI/ML engine identifying one or more of the plurality of access requests as a flagged access request that represents a possible security event for the facility;

automatically displaying on a display one or more images from a security camera that captures the flagged access request for review by a security operator;

receiving a response entered by the security operator, wherein the response classifies the flagged access request as either a legitimate access request or an illegitimate access request;

training the AI/ML engine based on the flagged access request and the corresponding received response; and issuing an alert and/or taking a corrective action when the response classifies the flagged access request as an illegitimate access request.

2. The method of claim 1, comprising: automatically displaying a pre-stored image of the particular authorized user that is associated with the access control key that was used in the flagged access request.

3. The method of claim 1, wherein the AI/ML engine is trained to determine whether a particular access request of a particular authorized user is a flagged access request based on the particular access request of the particular authorized user and a learned past behavior of the particular authorized user that is based on past access requests of the particular authorized user.

4. The method of claim 3, wherein the learned past behavior of the particular authorized user includes a learned pattern of past access requests of the particular authorized user.

5. The method of claim 4, wherein the learned pattern of past access requests of the particular authorized user includes a learned pattern in time of one or more past access requests of the particular authorized user.

6. The method of claim 4, wherein the learned pattern of past access requests of the particular authorized user includes a learned pattern in one or more access control devices associated with one or more past access requests of the particular authorized user.

7. The method of claim 1, comprising:

presenting one or more images from the security camera to the AI/ML engine associated with one or more of the plurality of access requests; and training the AI/ML engine based on one or more images from the security camera.

8. The method of claim 1, comprising:

performing facial recognition on the one or more images of the security camera to identify one or more faces associated with one or more of the plurality of access requests; and training the AI/ML engine based on one or more faces identified by the facial recognition.

9. The method of claim 1, comprising:

determining a severity level of a plurality of severity levels of each alert associated with a flagged access request that is classified as an illegitimate access request; and automatically taking an action that is based at least in part on the determined severity level.

10. The method of claim 9, wherein the action includes one or more of locking down one or more access control devices, dispatching security personnel, and/or disabling an access control key that is associated with the particular authorized user that is associated with the flagged access request.

11. The method of claim 1, comprising:

determining a severity level of a plurality of severity levels of each flagged access request; and displaying the severity level associated with each flagged access request.

12. The method of claim 1, comprising:

storing a different sensitivity level for each of at least two of the plurality of authorized users; and wherein the AI/ML engine uses the stored sensitivity levels when identifying which of the one or more of the plurality of access requests is identified as a flagged access request.

13. The method of claim 1, comprising:

when the AI/ML engine identifies an access request as a flagged access request that represents a possible security event for the facility, automatically sending a notification to the particular authorized user that corresponds to the flagged access request, and waiting for a predetermined period of time for a confirmation from the particular authorized user that the access request was legitimate; and when the confirmation is received from the particular authorized user within the predetermined period of time that the access request was legitimate, classifying the flagged access request as a legitimate access request directly instead of proceeding with display of images for review by the security operator.

14. An access control system for a facility, comprising:

one or more access control devices each located at a corresponding location in the facility for reading access control keys that are each associated with a corresponding one of a plurality of authorized users of the facility;

a display;

one or more security cameras;

a controller operatively coupled to the one or more access control devices, the display and the one or more security cameras, the controller configured to:

receive a plurality of access requests from the one or more access control devices, wherein each of the plurality of access requests is generated in response to one of the plurality of access control keys being presented to one of the access control devices, and wherein each of the plurality of access control keys is associated with a particular one of a plurality of authorized user of the facility;

present the plurality of access requests to an Artificial Intelligence and/or Machine Learning (AI/ML) engine, the AI/ML engine is trained to learn an access behavior pattern of each of the plurality of authorized user over time and across the one or more access control devices, the AI/ML engine determining when any particular access requests represents an abnormality in the learned access behavior pattern of the corresponding authorized user resulting in a flagged access request;

when the AI/ML engine determines that a particular access request represents a flagged access request, display on the display one or more images from one or more of the security cameras that capture the flagged access request for review by a security operator on the display;

receive a response, wherein the response classifies the flagged access request as either a legitimate access request or an illegitimate access request;

re-train the AI/ML engine based on the flagged access request and the corresponding received response; and issue an alert and/or take a corrective action when the flagged access request is classified as an illegitimate access request.

15. The access control system of claim 14, comprising determining a severity level of a plurality of severity levels of each flagged access request; and displaying the severity level associated with each flagged access request.

16. The access control system of claim 14, wherein the corrective action includes one or more of locking down one or more access control devices, dispatching security personnel, and/or disabling an access control key that is associated with the particular authorized user that is associated with the flagged access request.

17. A non-transitory computer readable medium storing instructions that when executed by one or more processors cause the one or more processors to:

receive a plurality of access requests from one or more access control devices of a facility, wherein each of the plurality of access requests is generated in response to one of a plurality of access control keys being presented to one of the access control devices, and wherein each of the plurality of access control keys is associated with a particular one of a plurality of authorized user of the facility;

present the plurality of access requests to an Artificial Intelligence and/or Machine Learning (AI/ML) engine, the AI/ML engine is trained to learn an access behavior pattern of each of the plurality of authorized user over time and over the one or more access control devices, the AI/ML engine determining whether any particular access requests represents an abnormality in the learned access behavior pattern of the corresponding authorized user, resulting in a flagged access request;

when the AI/ML engine determines that a particular access request represents a flagged access request, display on a display one or more images from a security camera that captures the flagged access request for review by a security operator;

receive a response, wherein the response classifies the flagged access request as either a legitimate access request or an illegitimate access request; and issue an alert and/or take a correction action when the response classifies the flagged access request as an illegitimate access request.

18. The non-transitory computer readable medium of claim 17, wherein the one or more processors re-train the AI/ML engine based on the flagged access request and the corresponding received response.

19. The non-transitory computer readable medium of claim 17, comprising:

determining a severity level of a plurality of severity levels of each flagged access request; and displaying the severity level associated with each flagged access request.

20. The non-transitory computer readable medium of claim 17, wherein the corrective action includes one or more of locking down one or more access control devices, dispatching security personnel, and/or disabling an access control key that is associated with the particular authorized user that is associated with the flagged access request.

* * * * *